US012792555B2

(12) United States Patent
Yi

(10) Patent No.: US 12,792,555 B2
(45) Date of Patent: Nov. 10, 2026

(54) LOAD MANAGEMENT ARCHITECTURE FOR ARTIFICIAL INTELLIGENCE (AI) ACCELERATION

(71) Applicant: Samsung Electronics Co., Ltd., Suwon-si (KR)

(72) Inventor: Donny Yi, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 178 days.

(21) Appl. No.: 18/795,159

(22) Filed: Aug. 5, 2024

(65) Prior Publication Data

US 2025/0181548 A1 Jun. 5, 2025

Related U.S. Application Data

(60) Provisional application No. 63/606,091, filed on Dec. 4, 2023.

(51) Int. Cl.
*G06F 13/42* (2006.01)

(52) U.S. Cl.
CPC ................................ *G06F 13/4291* (2013.01)

(58) Field of Classification Search
CPC ........ G06F 3/42; G06F 13/4291; G06N 3/063
See application file for complete search history.

(56) References Cited

U.S. PATENT DOCUMENTS 10,331,494 B2 6/2019 Qi et al.
10,983,581 B2 4/2021 Jahagirdar et al.
11,644,834 B2 5/2023 Ditty et al.
11,768,504 B2 9/2023 Ebrahimi Afrouzi et al.
2014/0063026 A1* 3/2014 Oh ........................ G06F 1/3203 345/519
2017/0212563 A1* 7/2017 Farazmand ........... G06F 9/5027
2020/0050920 A1* 2/2020 Idgunji ................. G06F 1/3243
2021/0091756 A1* 3/2021 Iwata ...................... G06F 1/324
2021/0117242 A1 4/2021 Van de Groenendaal et al.
2021/0157639 A1* 5/2021 Nijasure .................. G06T 1/20
2021/0191490 A1 6/2021 Kandula et al.
2021/0200255 A1* 7/2021 Alla ........................ G06F 1/324
2022/0100247 A1 3/2022 Garg et al.
2022/0104765 A1 4/2022 Shelton, IV et al.
2022/0374262 A1 11/2022 Bahl et al.
2023/0119235 A1* 4/2023 Hutton ...................... G06F 1/08 713/503
2024/0094796 A1* 3/2024 Narayanaswamy .... G06F 1/206

FOREIGN PATENT DOCUMENTS

CN 110481541 B 4/2021
WO 2019153188 A1 8/2019
WO 2023130824 A1 7/2023

* cited by examiner

*Primary Examiner* — Phong H Dang

(74) *Attorney, Agent, or Firm* — Renaissance IP Law Group LLP

(57) ABSTRACT

A device comprising an accelerator is disclosed. An interface may receive a frequency control signal from a processor. A control circuit may set a frequency of a circuit based at least in part on the frequency control signal from the processor. The circuit may process data based at least in part on a data processing command from the processor.

20 Claims, 6 Drawing Sheets

LOAD MANAGEMENT ARCHITECTURE FOR ARTIFICIAL INTELLIGENCE (AI) ACCELERATION

RELATED APPLICATION DATA

This application claims the benefit of U.S. Provisional Patent Application Ser. No. 63/606,091, filed Dec. 4, 2023, which is incorporated by reference herein for all purposes.

FIELD

The disclosure relates generally to accelerators, and more particularly to managing the load of an artificial intelligence (AI) accelerator.

BACKGROUND

The use of accelerators, particularly in processing large data models for Artificial Intelligence (AI) or Machine Learning (ML), may involve the use of accelerators. Processing operations may involve processing large amounts of data, or performing multiple calculations on a particular data. Because of the varying workloads, efficient operation of accelerators may be difficult to achieve.

A need remains to manage accelerator loads efficiently.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
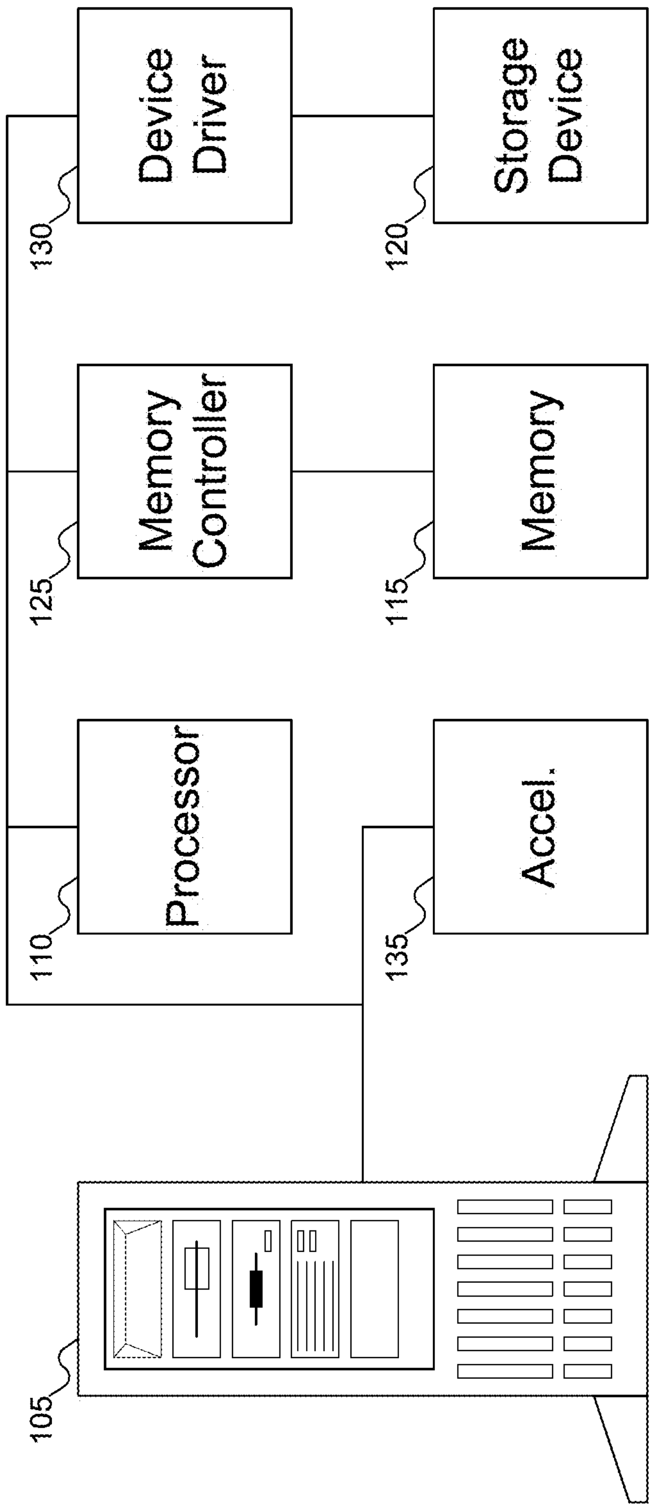
FIG. 1 shows a machine including an accelerator, according to embodiments of the disclosure.

An accelerator may receive a frequency control signal from software. The accelerator may use the frequency control signal to control the frequency of the accelerator.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Processing large amounts of data, for example, for Artificial Intelligence (AI) or Machine Learning (ML) models, may involve hardware that uses various accelerators. The workloads on these accelerators may vary: some workloads might be processing-intensive, while other workloads might be data-intensive.

Operating the accelerators at their maximum frequency might result in the fastest results from the accelerators. But operating the accelerators at their maximum frequency might also mean that the accelerators consume the most power, which may be inefficient from a power-management point of view. In addition, the accelerators might not need to operate all the time at maximum power. It might be desirable for two or more accelerators to end their processing at the same time. When operating at maximum frequency, one accelerator might finish before the other, leaving that accelerator to idle until the other accelerator finishes its processing. If the first accelerator were to operate at a lower frequency, it might consume less power and finish its operations in a way that roughly coincides with the other accelerator, avoiding the accelerator idling.

Accelerators may include a Proportional Integrator Derivative (PID) control loop, which may adjust the operating frequency of the accelerator. Depending on how busy the accelerator currently is and what is considered a target busy level, the PID control loop may suggest adjusting the frequency of the accelerator up or down smoothly to reach the target busy level. But the PID control loop does not know about other accelerators and when they might finish their processing of data: the PID control loop works for the accelerator in isolation. In addition, the PID control loop has no information about what the workload of the accelerator may be for the next iteration.

Embodiments of the disclosure address these issues by introducing a frequency control signal from an AI workload runtime software running under the operating system. The AI workload runtime software, or AI software for short, may handle the division and scheduling of work, and thus may have information regarding the current and future workloads for both the accelerator and other accelerators. The AI software may issue frequency control signals to the accelerators to manage their power consumption and to coordinate when the accelerators finish their processing. Embodiments of the disclosure may issue frequency control signals based on the type of processing the accelerator is to perform, the number of vectors the accelerator is to process, or the dimensionality of the vectors (the number of coordinates in the vectors) that the accelerator is to process. Embodiments of the disclosure may use the frequency control signals to override an internal frequency control signal from a PID, or to override a minimum or maximum frequency established for the accelerator.

FIG. 1 shows a machine including an accelerator, according to embodiments of the disclosure. In FIG. 1, machine 105, which may also be termed a host or a system, may include processor 110, memory 115, and storage device 120.

Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115, which may also be referred to as a main memory, may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with an accelerator (which may be accelerator 135 or may be a different accelerator), which may also be referred to as a computational storage device, computational storage unit, computational storage device, or computational device. Storage device 120 and the accelerator may be designed and manufactured as a single integrated unit, or the accelerator may be separate from storage device 120. The phrase "associated with" is intended to cover both a single integrated unit including both a storage device and an accelerator and a storage device that is paired with an accelerator but that are not manufactured as a single integrated unit. In other words, a storage device and an accelerator may be said to be "paired" when they are physically separate devices but are connected in a manner that enables them to communicate with each other. Further, in the remainder of this document, any reference to storage device 120 may be understood to refer to the devices either as physically separate but paired (and therefore may include the other device) or to both devices integrated into a single component as a computational storage unit.

In addition, the connection between the storage device and the paired accelerator might enable the two devices to communicate, but might not enable one (or both) devices to work with a different partner: that is, the storage device might not be able to communicate with another accelerator, and/or the accelerator might not be able to communicate with another storage device. For example, the storage device and the paired accelerator might be connected serially (in either order) to the fabric, enabling the accelerator to access information from the storage device in a manner another accelerator might not be able to achieve.

While FIG. 1 uses the generic term "storage device", embodiments of the disclosure may include any storage device formats that may be associated with computational storage, examples of which may include hard disk drives and Solid State Drives (SSDs). Any reference to a specific type of storage device, such as an "SSD", below should be understood to include such other embodiments of the disclosure.

Processor 105 and storage device 120 may communicate across a fabric (not shown in FIG. 1). This fabric may be any fabric along which information may be passed. Such fabrics may include fabrics that may be internal to machine 105, and which may use interfaces such as Peripheral Component Interconnect Express (PCIe), Serial AT Attachment (SATA), or Small Computer Systems Interface (SCSI), among others. Such fabrics may also include fabrics that may be external to machine 105, and which may use interfaces such as Ethernet, Infiniband, or Fibre Channel, among others. In addition, such fabrics may support one or more protocols, such as Non-Volatile Memory Express (NVMe), NVMe over Fabrics (NVMe-oF), Simple Service Discovery Protocol (SSDP), or a cache-coherent interconnect protocol, such as the Compute Express Link® (CXL®) protocol, among others. (Compute Express Link and CXL are registered trademarks of the Compute Express Link Consortium in the United States.) Thus, such fabrics may be thought of as encompassing both internal and external networking connections, over which commands may be sent, either directly or indirectly, to storage device 120. In embodiments of the disclosure where such fabrics support external networking connections, storage device 120 might be located external to machine 105, and storage device 120 might receive requests from a processor remote from machine 105.

FIG. 1 also shows accelerator 135. Accelerator 135 may be a standalone element, or accelerator 135 may be included as part of another device, such as storage device 120, a network interface card, or any other desired element. Like processor 105, Accelerator 135 may implement a Reduced Instruction Set Computer (RISC) architecture or a Complex Instruction Set Computer (CISC) architecture (among other possibilities), and may be implemented using a Central Processing Unit (CPU), a Field Programmable Gate Array (FPGA), an Application-Specific Integrated Circuit (ASIC), A System-on-a-Chip (SoC), a Graphics Processing Unit (GPU), a General Purpose GPU (GPGPU), a Neural Processing Unit (NPU), or a Tensor Processing Unit (TPU), but often may implement a neural network. Accelerator 135 may be an accelerator designed to perform any processing typically requiring specialized processing, such as a neural network processor for use with Artificial Intelligence (AI) computing tasks such as natural language processing. But while FIG. 1 shows accelerator 135, embodiments of the disclosure may include any accelerator 135 that processes data, whether or not using neural networks, and may be used to solve any desired problem, whether or not natural language processing. For example, embodiments of the disclosure may include accelerator 135 designed to use a transfer model with repetitions for image processing.

While FIG. 1 shows only one accelerator 135, embodiments of the disclosure may include any number (one or more) of accelerators 135. For example, two or more accelerators 135 may be configured to process data serially, so that the output of one accelerator 135 may be input to the next accelerator 135. Or, accelerators 135 may be configured to process data in parallel, with each accelerator 135 operating independently of the others. In either case, it may be more efficient for each or all accelerators 135 to end their processing at roughly the same time, in which case management of accelerators 135 may be beneficial.

Figure 2:
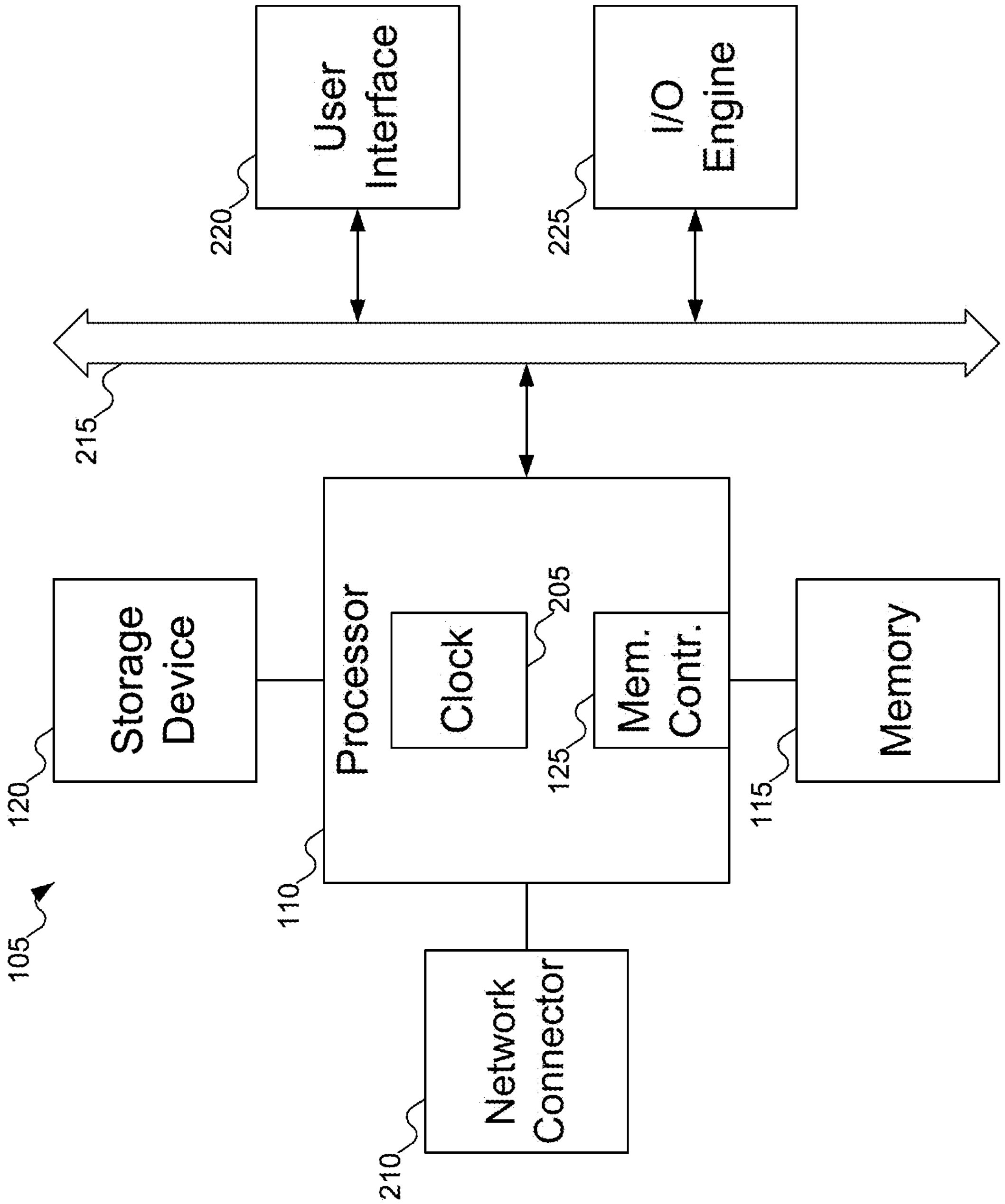
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
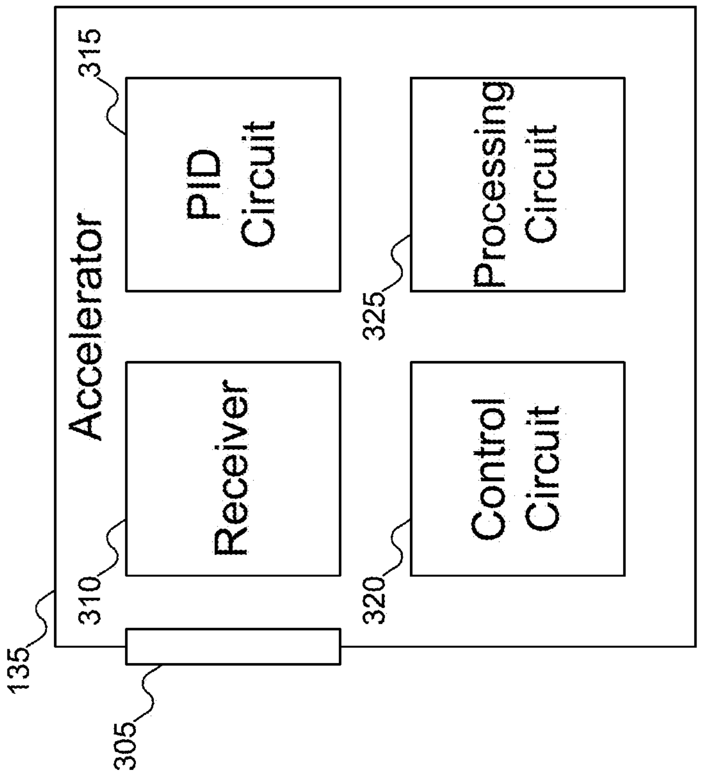
FIG. 3 shows details of the accelerator of FIG. 1, according to embodiments of the disclosure.

FIG. 3 shows details of accelerator 135 of FIG. 1, according to embodiments of the disclosure. In FIG. 3, accelerator 135 may include interface 305, receiver 310, Proportional Integrator Derivative (PID) control loop 315, control circuit 320, and processing circuit 325. Interface 305 may be used to connect accelerator 135 to processor 110 of FIG. 1, as well as other components of machine 105 of FIG. 1. Receiver 310 may receive a signal over interface 305 and may determine what that signal represents: for example, a command to process data, the data to be processed, or (as discussed with reference to FIG. 4 below) a frequency control signal. PID control loop 315 (which may also be referred to as a PID circuit, a PID controller, or simply a PID) may generate an internal frequency control signal. Control circuit 320 may use the internal frequency control signal generated by PID control loop 315 (and, as discussed with reference to FIG. 4 below, a frequency control signal) to determine the frequency at which processing circuit 325 may operate. Processing circuit 325 (which may also be referred to as a circuit) may process data according to a data processing command received at accelerator 135 from processor 110 of FIG. 1.

There are a number of reasons the frequency (that is, the clock cycle) of processing circuit 325 matters. First, there is a correlation between frequency and power consumption. The higher the frequency of processing circuit 325, the greater the power consumed. Since minimizing the amount of power used by accelerator 135 may be an objective, it may be considered more efficient for accelerator 135 to operate at a lower frequency, even if it means the computations may take a little longer. Second, if there is more than one accelerator 135 in machine 105 of FIG. 1, it may be useful for both or all accelerators 135 to operate in sync, each starting and ending their processing of a data processing command at around the same time. This choice may be particularly important where the accelerators 135 are in a producer-consumer relationship, since it is inefficient for either the producer or the consumer to be idling waiting for the other accelerator to become free. That is, the producer should not generate data for the consumer faster than the consumer is ready to consume the data (in which case the producer may waste time idling), nor should the consumer consume data faster than the producer is ready to produce data (in which case the consumer may waste time idling). By coordinating the operations of both accelerators 135, neither accelerator 135 may spend too much time idling, resulting in more efficient operations. Third, different types of data processing commands may imply different workloads. For example, a data processing command that involves reading data from memory 110 of FIG. 1, which may be described as memory-bound, may depend to some extent on the time required to access data from memory 110 of FIG. 1. Since accessing data from memory 110 of FIG. 1 may be a relatively slow operation, as accessing data may require accessing memory 110 of FIG. 1 across a fabric, it may be more efficient for accelerator 135 to operate at a lower frequency. On the other hand, a data processing command that runs computations on data in accelerator 135 (for example, in some local memory not shown in FIG. 3), which may be described as computation-bound, may operate relatively quickly, as the only limit on operation is the speed of processing circuit 325. Thus, it may be more efficient for accelerator 135 to operate at a higher frequency when computation-bound.

In addition, the actual frequency to be used by accelerator 135 may depend on other factors. For example, the dimensionality of the data (that is, the number of coordinates in the data vectors) and the number of vectors in the data may factor into the calculation of the appropriate frequency control signal. Similarly, the architecture of accelerator 135 may be relevant in calculating the frequency control signal for accelerator 135. As the specifics of how the frequency control signal may depend on numerous factors, how a particular example frequency may be calculated for a particular accelerator 135 is not described herein.

Figure 4:
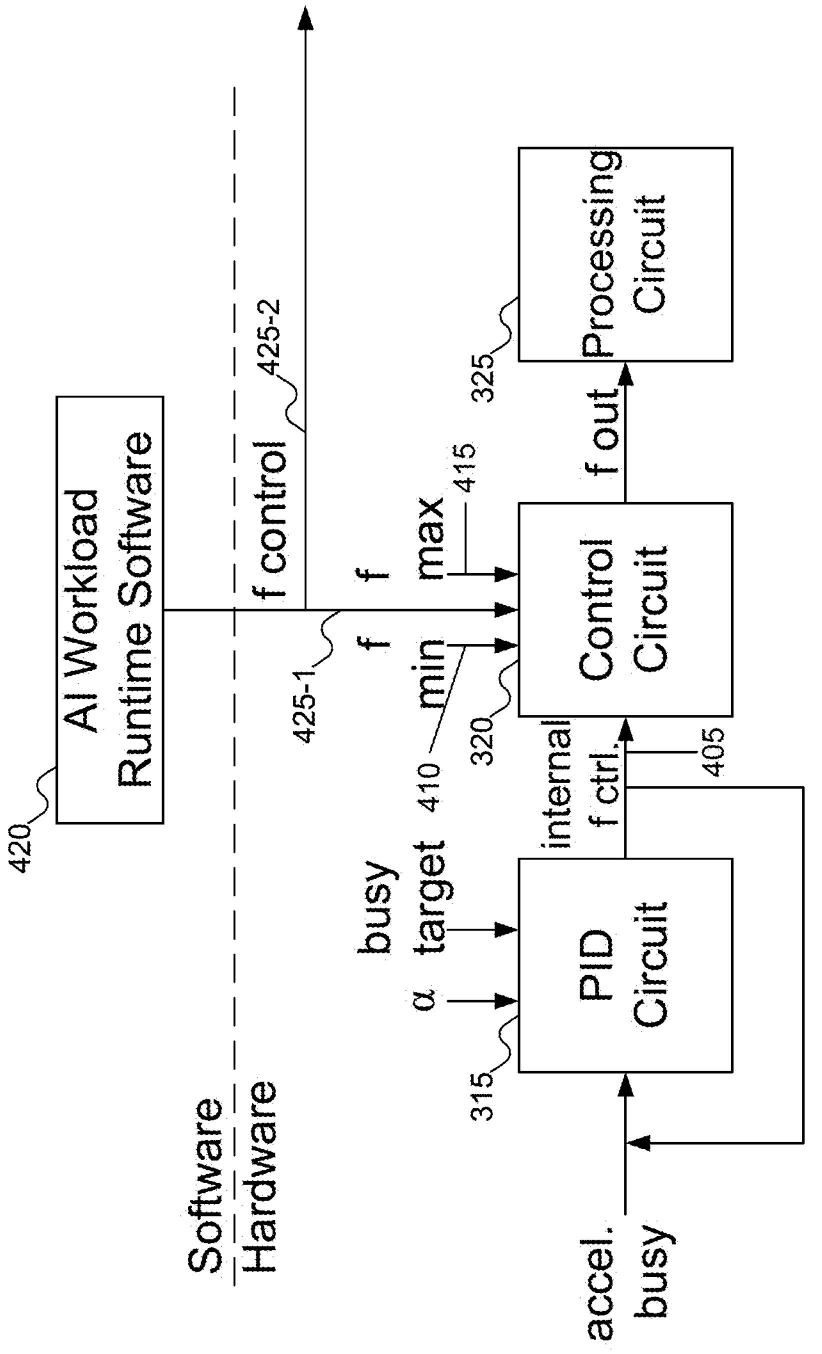
FIG. 4 shows the accelerator of FIG. 1 receiving a signal from software running on the processor of FIG. 1, according to embodiments of the disclosure.

FIG. 4 shows accelerator 135 of FIG. 1 receiving a signal from software running on processor 110 of FIG. 1, according to embodiments of the disclosure. In FIG. 4, PID control loop 315 may take as input the current busy level of accelerator 135 of FIG. 1, along with a target busy level for accelerator 135 of FIG. 1 and a, which may function as a filter signal, and may smooth out the target busy signal. PID control loop 315 may then generate internal frequency control signal 405, which may be sent to control circuit 320. Note that internal frequency control signal 405 may also feed back into the busy level of accelerator 135 of FIG. 1: the current frequency of processing circuit 325 may affect the busy level of accelerator 135 of FIG. 1.

Control circuit 320 may then compare internal frequency control signal 405 with frequency minimum 410 and frequency maximum 415. Frequency minimum 410 and frequency maximum 415 may represent the lower and upper bounds, respectively, for the frequency of accelerator 135 of FIG. 1. If internal frequency control signal 405 is within the bounds of frequency minimum 410 and frequency maximum 415, then control circuit 320 may apply internal frequency control signal 405 as specified by PID control loop 315; otherwise, control circuit 320 may apply frequency minimum 410 or frequency maximum 415, as appropriate. Frequency minimum 410 and/or frequency maximum 415 may be specified in any desired manner: for example, frequency minimum 410 and/or frequency maximum 415 may be read from firmware or other storage in accelerator 135 of FIG. 1. Once internal frequency control signal 405 has been adjusted to respect frequency minimum 410 and frequency maximum 415, then control circuit 320 may send a frequency signal to processing circuit 325, establishing the frequency processing circuit 325 should use.

While the operation of accelerator 135 of FIG. 1 is adequate, accelerator 135 of FIG. 1 lacks some useful information. For example, processor 110 of FIG. 1 may support an operating system, which may include AI Workload Runtime Software 420, which may also be referred to as software 420. Software 420 may be responsible for dispatching data processing commands to accelerator 135 of FIG. 1. As such, software 420 may have information about the workloads of the data processing commands: what data processing commands may be memory-bound vs. computation-bound, what data processing commands may be part of a producer-consumer relationship with another accelerator 135, the dimensionality of the data and the number of vectors in the data, and so on. This information may not be available to accelerator 135 of FIG. 1, and therefore software 420 may have additional information that may be used in determining the frequency control signal.

Thus, as shown in FIG. 4, software 420 may send frequency control signal 425-1 to control circuit 320. (Software 420 may also send another frequency control signal 425-2 to another accelerator 135 of FIG. 1: the two frequency control signals 425 may specify the same frequency for both accelerators, or the two frequency control signals 425 may differ.) Control circuit 320, upon receiving frequency control signal 425-1, may apply that frequency. This application of frequency control signal 425-1 may therefore override internal frequency control signal 405. Note that, in some embodiments of the disclosure, frequency control signal 425-1 may also exceed the bounds of frequency minimum 410 and/or frequency maximum 415.

While FIG. 4 includes software 420, embodiments of the disclosure may include a hardware circuit that may send signal 425 to control circuit 320. Provided that such hardware circuit has access to the workload the data processing command may require of the accelerator, a hardware circuit is capable of sending frequency control signal 425 to control circuit 320.

In some embodiments of the disclosure, control circuit 320 may apply the frequency specified in frequency control signal 425-1 for the duration of executing the data processing command by processing circuit 325. In other embodiments of the disclosure, control circuit 320 may apply the frequency specified in frequency control signal 425-1 until either a new frequency is specified in a new frequency control signal 425-1, or until software 420 de-asserts frequency control signal 425-1. Once control circuit 320 does not apply frequency control signal 425-1 anymore, internal frequency control signal 405 from PID control loop 315 may be applied instead, and the bounds of control circuit 320 may apply the frequency specified in frequency control signal 425-1, and the bounds of frequency minimum 410 and/or frequency maximum 415 may also be applied.

Figure 5:
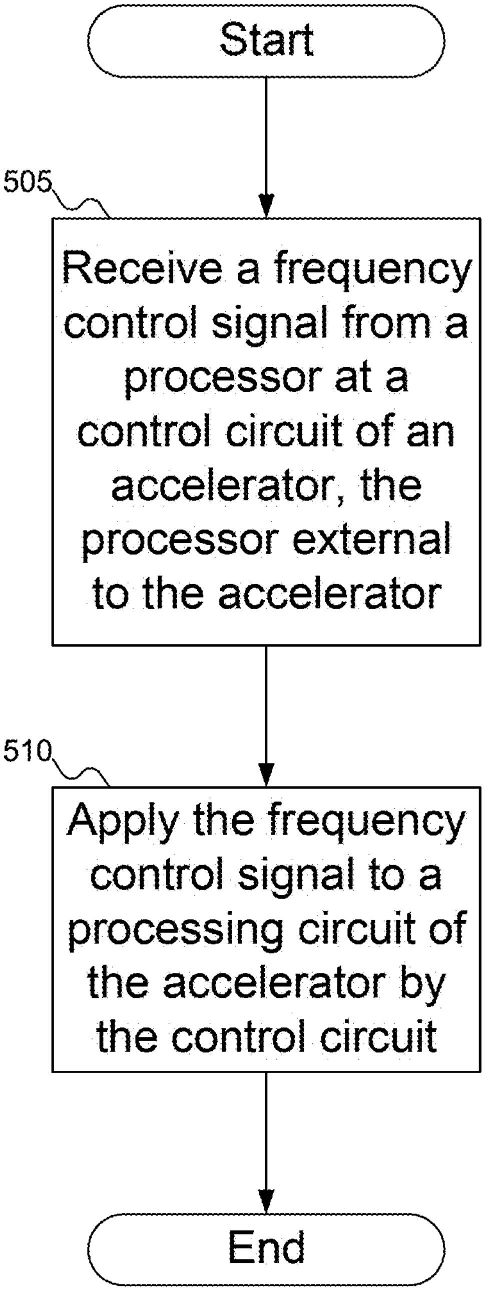
FIG. 5 shows a flowchart of an example procedure for the accelerator of FIG. 1 to use the frequency control signal of FIG. 4, according to embodiments of the disclosure.

FIG. 5 shows a flowchart of an example procedure for accelerator 135 of FIG. 1 to use frequency control signal 425 of FIG. 4, according to embodiments of the disclosure. In FIG. 5, at block 505, accelerator 135 of FIG. 1 may receive frequency control signal 425 of FIG. 4 from software 420 of FIG. 4. At block 510, control circuit 320 of FIG. 3 may apply frequency control circuit 425 of FIG. 4 to processing circuit 325 of FIG. 3.

Figure 6:
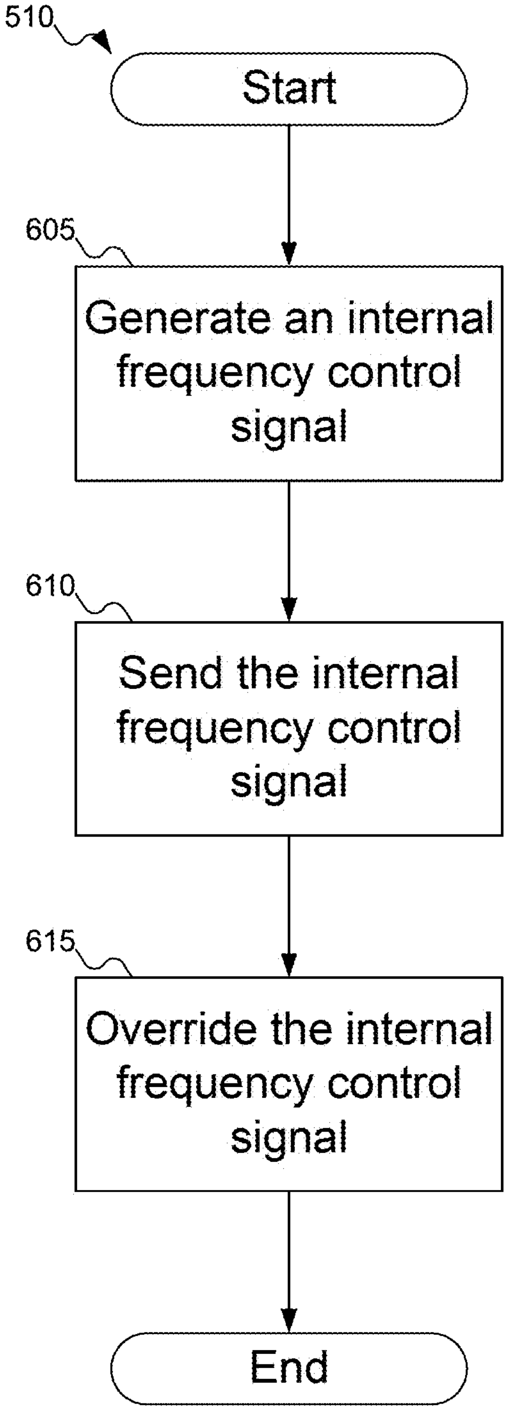
FIG. 6 shows a flowchart of an example procedure for the accelerator of FIG. 1 to use the frequency control signal of FIG. 4 to override the internal frequency control signal of FIG. 4 from the Proportional Integrator Derivative (PID) control loop of FIG. 3, according to embodiments of the disclosure.

FIG. 6 shows a flowchart of an example procedure for accelerator 135 of FIG. 1 to use frequency control signal 425 of FIG. 4 to override internal frequency control signal 405 of FIG. 4 from PID control loop 315 of FIG. 3, according to embodiments of the disclosure. In FIG. 6, at block 605, PID control loop 315 of FIG. 3 may generate internal frequency control signal 405 of FIG. 4. At block 610, PID control loop 315 of FIG. 3 may send internal frequency control signal 405 of FIG. 4 to control circuit 320 of FIG. 3. At block 615, control circuit 320 of FIG. 3 may override internal frequency control signal 405 of FIG. 4 with frequency control signal 425 of FIG. 4.

Figure 7:
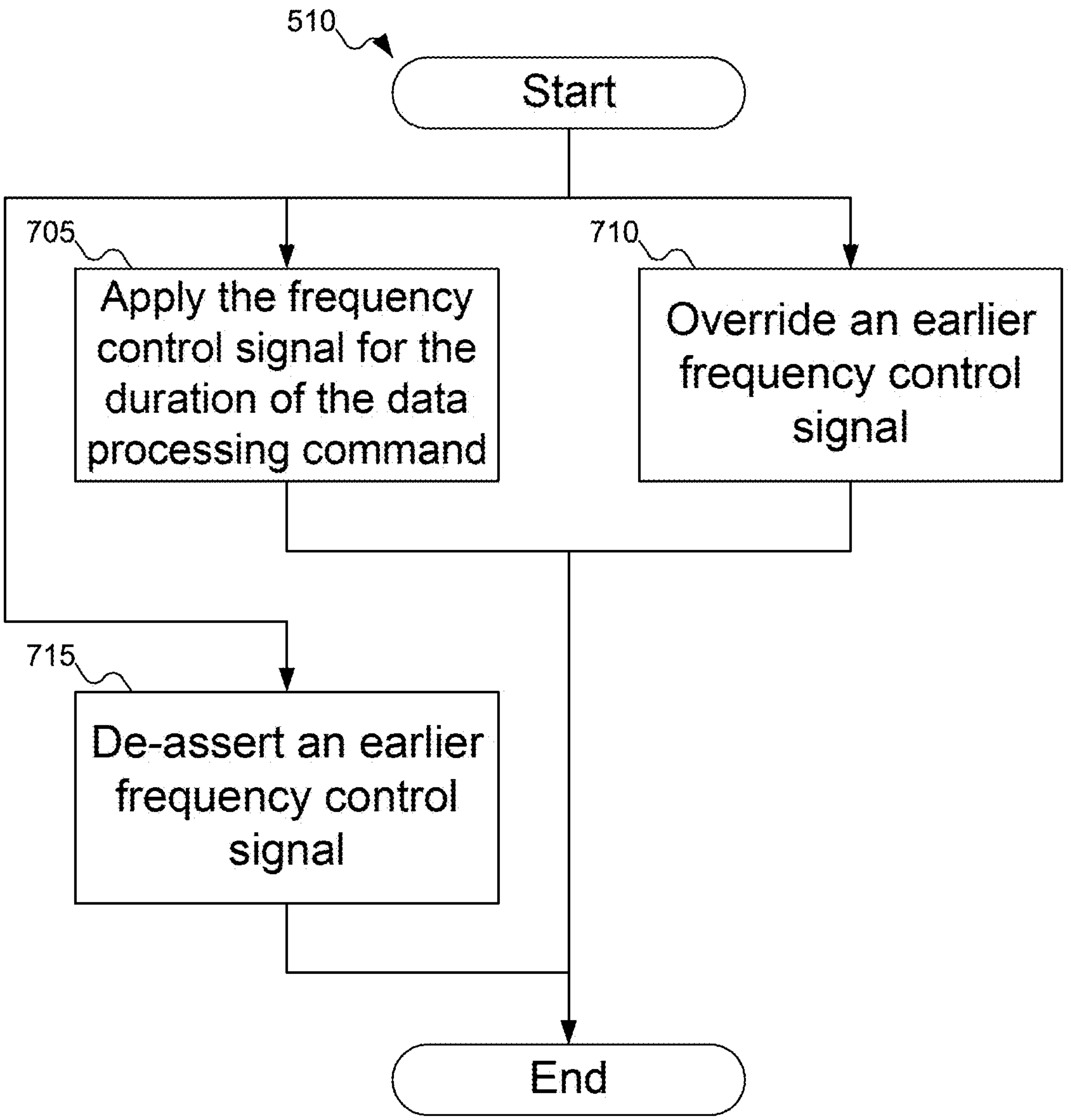
FIG. 7 shows a flowchart of an example procedure for the accelerator of FIG. 1 to apply the frequency control signal of FIG. 4, according to embodiments of the disclosure.

FIG. 7 shows a flowchart of an example procedure for accelerator 135 of FIG. 1 to apply frequency control signal 425 of FIG. 4, according to embodiments of the disclosure. In FIG. 7, at block 705, control circuit 320 of FIG. 3 may apply frequency control signal 425 of FIG. 4 for the duration of the data processing command: when the data processing command ends, control circuit 320 of FIG. 3 may then apply internal frequency control signal 405 of FIG. 4 from PID control loop 315 of FIG. 3. Alternatively, at block 710, control circuit 320 of FIG. 3 may continue to apply frequency control signal 425 of FIG. 4 until control circuit 320 of FIG. 3 receives a new frequency control signal 425 of FIG. 4 from software 420 of FIG. 4, at which point control circuit 320 of FIG. 3 may override the old frequency control signal 425 of FIG. 4 with the new frequency control signal 425 of FIG. 4. Alternatively, at block 715, PID control loop 315 of FIG. 3 may de-assert frequency control signal 425 of FIG. 4 based on a signal from software 420 of FIG. 4.

In FIGS. 5-7, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may include software to generate a frequency control signal for an accelerator. The accelerator may include a control circuit which may receive the frequency control signal, and which may override an internal frequency control signal generated internally: for example, by a Proportional Integrator Derivative (PID) control loop. As the software may have access to information about the workload that the PID control loop may not have access to, the frequency control signal from the software may result in a more efficient operation of the accelerator, providing a technical advantage.

Artificial Intelligence (AI) Accelerators require precise frequency and performance management architecture. Time to completion for a units of work is hard to predict. Embodiments of the disclosure provide a hardware/software based solution to load management for AI accelerators.

Embodiments of the disclosure may enable independent demand based frequency control for accelerators. Software-driven boost signals may provide for tight hardware/software coordination. Embodiments of the disclosure may be scalable for multiple accelerators. Each accelerator may use the following parameters for independent frequency control:

| parameter | description | range |
|---|---|---|
| acc_busy | accelerator busy - definition depends on accelerator topology | 0-100 |
| alpha | derivative filter constant to reduce busy signal noise | n/a |
| busy_target | target busy of the accelerator | 0-100 |
| freq_min | frequency floor | n/a |
| freq_max | frequency ceiling | n/a |
| fctrl | software based frequency control signal | 0/1 |

Embodiments of the disclosure may support independent demand based frequency control, which may enable hardware based workload balancing, power consumption control via frequency management, programmable frequency minimum, maximum, and responsiveness to allow for finer grained heterogeneous solutions. Embodiments of the disclosure may support for fast responsiveness but power hungry accelerators, medium responsiveness accelerators, for balanced performance, and economic accelerators for maximal power efficiency. Embodiments of the disclosure may help to solve complex producer/consumer relationships within multi-accelerator topology.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes an accelerator, comprising:

an interface to receive a frequency control signal from a processor;

a circuit to process data based at least in part on a data processing command from the processor; and a control circuit to set a frequency of the circuit based at least in part on the frequency control signal from the processor.

Statement 2. An embodiment of the disclosure includes the accelerator according to statement 1, wherein the interface is configured to receive the frequency control signal from a software executing on the processor.

Statement 3. An embodiment of the disclosure includes the accelerator according to statement 2, wherein the interface is configured to receive the frequency control signal from an Artificial Intelligence (AI) workload software executing on the processor.

Statement 4. An embodiment of the disclosure includes the accelerator according to statement 1, further comprising a Proportional Integrator Derivative (PID) controller to generate an internal frequency control signal for the accelerator sent to the control circuit.

Statement 5. An embodiment of the disclosure includes the accelerator according to statement 4, wherein the control circuit applies the frequency control signal.

Statement 6. An embodiment of the disclosure includes the accelerator according to statement 5, wherein the control circuit applies the frequency control signal to override the internal frequency control signal from the PID controller.

Statement 7. An embodiment of the disclosure includes the accelerator according to statement 1, wherein the control circuit includes a maximum frequency for the circuit.

Statement 8. An embodiment of the disclosure includes the accelerator according to statement 7, wherein the accelerator includes a firmware, the firmware including the maximum frequency.

Statement 9. An embodiment of the disclosure includes the accelerator according to statement 7, wherein the frequency control signal is greater than the maximum frequency for the circuit.

Statement 10. An embodiment of the disclosure includes the accelerator according to statement 1, wherein the control circuit includes a minimum frequency for the circuit.

Statement 11. An embodiment of the disclosure includes the accelerator according to statement 10, wherein the accelerator includes a firmware, the firmware including the minimum frequency.

Statement 12. An embodiment of the disclosure includes the accelerator according to statement 10, wherein the frequency control signal is less than the minimum frequency for the circuit.

Statement 13. An embodiment of the disclosure includes the accelerator according to statement 1, wherein the frequency control signal is based at least in part on one of a first workload of the accelerator or a first implementation of the accelerator.

Statement 14. An embodiment of the disclosure includes the accelerator according to statement 13, wherein the frequency control signal is further based at least in part on one of a second workload of a second accelerator or a second implementation of the second accelerator.

Statement 15. An embodiment of the disclosure includes the accelerator according to statement 14, wherein:

the first workload of the accelerator includes a first memory-bound workload or a first computational-bound workload; and the second workload of the second accelerator includes a second memory-bound workload or a second computational-bound workload.

Statement 16. An embodiment of the disclosure includes the accelerator according to statement 14, wherein:

the first workload of the accelerator includes a first dimensionality of a first data to be processed using the accelerator or a first number of vectors of the first data to be processed using the accelerator; and the second workload of the second accelerator includes a second dimensionality of a second data to be processed using the second accelerator or a second number of vectors of the second data to be processed using the second accelerator.

Statement 17. An embodiment of the disclosure includes the accelerator according to statement 14, wherein the frequency control signal is calculated to coordinate the accelerator and the second accelerator.

Statement 18. An embodiment of the disclosure includes the accelerator according to statement 14, wherein the frequency control signal coordinates the accelerator and the second accelerator.

Statement 19. An embodiment of the disclosure includes the accelerator according to statement 1, wherein the control circuit applies the frequency control signal to the data processing command.

Statement 20. An embodiment of the disclosure includes the accelerator according to statement 1, wherein the control circuit applies the frequency control signal overrides a second frequency control signal.

Statement 21. An embodiment of the disclosure includes the accelerator according to statement 1, wherein the frequency control signal de-asserts a second frequency control signal.

Statement 22. An embodiment of the disclosure includes a method, comprising:

receiving a frequency control signal from a processor at a control circuit of an accelerator, the processor external to the accelerator; and applying the frequency control signal to a circuit of the accelerator by the control circuit, the circuit configured to process data based at least in part on a data processing command from the processor.

Statement 23. An embodiment of the disclosure includes the method according to statement 22, wherein receiving the frequency control signal from the processor at the control circuit of the accelerator includes receiving the frequency control signal from a software executing on the processor at the control circuit of the accelerator.

Statement 24. An embodiment of the disclosure includes the method according to statement 23, wherein receiving the frequency control signal from the software executing on the processor at the control circuit of the accelerator includes receiving the frequency control signal from an Artificial Intelligence (AI) workload software executing on the processor at the control circuit of the accelerator.

Statement 25. An embodiment of the disclosure includes the method according to statement 22, wherein:

the method further comprises:

generating an internal frequency control signal at a Proportional Integrator Derivative (PID) controller of the accelerator; and sending the internal frequency control signal from the PID controller to the control circuit; and applying the frequency control signal to the circuit of the accelerator by the control circuit includes overriding the internal frequency control signal with the frequency control signal.

Statement 26. An embodiment of the disclosure includes the method according to statement 22, wherein the control circuit includes a maximum frequency.

Statement 27. An embodiment of the disclosure includes the method according to statement 26, wherein the frequency control signal is greater than the maximum frequency.

Statement 28. An embodiment of the disclosure includes the method according to statement 26, further comprising reading the maximum frequency from a firmware of the accelerator.

Statement 29. An embodiment of the disclosure includes the method according to statement 22, wherein the control circuit includes a minimum frequency.

Statement 30. An embodiment of the disclosure includes the method according to statement 29, wherein the frequency control signal is less than the minimum frequency.

Statement 31. An embodiment of the disclosure includes the method according to statement 29, further comprising reading the minimum frequency from a firmware of the accelerator.

Statement 32. An embodiment of the disclosure includes the method according to statement 22, wherein the frequency control signal is based at least in part on one of a first workload of the accelerator or a first implementation of the accelerator.

Statement 33. An embodiment of the disclosure includes the method according to statement 32, wherein the frequency control signal is further based at least in part on one of a second workload of a second accelerator or a second implementation of the second accelerator.

Statement 34. An embodiment of the disclosure includes the method according to statement 33, wherein:

the first workload of the accelerator includes a first memory-bound workload or a first computational-bound workload; and the second workload of the second accelerator includes a second memory-bound workload or a second computational-bound workload.

Statement 35. An embodiment of the disclosure includes the method according to statement 33, wherein:

the first workload of the accelerator includes a first dimensionality of a first data to be processed using the accelerator or a first number of vectors of the first data to be processed using the accelerator; and the second workload of the second accelerator includes a second dimensionality of a second data to be processed using the second accelerator or a second number of vectors of the second data to be processed using the second accelerator.

Statement 36. An embodiment of the disclosure includes the method according to statement 33, wherein the frequency control signal is calculated to coordinate the accelerator and the second accelerator.

Statement 37. An embodiment of the disclosure includes the method according to statement 33, wherein the frequency control signal coordinates the accelerator and the second accelerator.

Statement 38. An embodiment of the disclosure includes the method according to statement 22, wherein applying the frequency control signal to the circuit of the accelerator by the control circuit includes applying the frequency control signal to the circuit of the accelerator by the control circuit for the data processing command.

Statement 39. An embodiment of the disclosure includes the method according to statement 22, wherein applying the frequency control signal to the circuit of the accelerator by the control circuit includes overriding a second frequency control signal by the control circuit based at least in part on the frequency control signal.

Statement 40. An embodiment of the disclosure includes the method according to statement 22, wherein applying the frequency control signal to the circuit of the accelerator by the control circuit includes de-asserting a second frequency control signal based at least in part on the frequency control signal.

Statement 41. An embodiment of the disclosure includes a system, comprising a non-transitory storage medium, the non-transitory storage medium having stored thereon instructions that, when executed by a machine, result in:

receiving a frequency control signal from a processor at a control circuit of an accelerator, the processor external to the accelerator; and applying the frequency control signal to a circuit of the accelerator by the control circuit, the circuit configured to process data based at least in part on a data processing command from the processor.

Statement 42. An embodiment of the disclosure includes the system according to statement 41, wherein receiving the frequency control signal from the processor at the control circuit of the accelerator includes receiving the frequency control signal from a software executing on the processor at the control circuit of the accelerator.

Statement 43. An embodiment of the disclosure includes the system according to statement 42, wherein receiving the frequency control signal from the software executing on the processor at the control circuit of the accelerator includes receiving the frequency control signal from an Artificial Intelligence (AI) workload software executing on the processor at the control circuit of the accelerator.

Statement 44. An embodiment of the disclosure includes the system according to statement 41, wherein:

the non-transitory storage medium has stored thereon further instructions that, when executed by the machine, result in:

generating an internal frequency control signal at a Proportional Integrator Derivative (PID) controller of the accelerator; and sending the internal frequency control signal from the PID controller to the control circuit; and applying the frequency control signal to the circuit of the accelerator by the control circuit includes overriding the internal frequency control signal with the frequency control signal.

Statement 45. An embodiment of the disclosure includes the system according to statement 41, wherein the control circuit includes a maximum frequency.

Statement 46. An embodiment of the disclosure includes the system according to statement 45, wherein the frequency control signal is greater than the maximum frequency.

Statement 47. An embodiment of the disclosure includes the system according to statement 45, the non-transitory storage medium having stored thereon further instructions that, when executed by the machine, result in reading the maximum frequency from a firmware of the accelerator.

Statement 48. An embodiment of the disclosure includes the system according to statement 41, wherein the control circuit includes a minimum frequency.

Statement 49. An embodiment of the disclosure includes the system according to statement 48, wherein the frequency control signal is less than the minimum frequency.

Statement 50. An embodiment of the disclosure includes the system according to statement 48, the non-transitory storage medium having stored thereon further instructions that, when executed by the machine, result in reading the minimum frequency from a firmware of the accelerator.

Statement 51. An embodiment of the disclosure includes the system according to statement 41, wherein the frequency control signal is based at least in part on one of a first workload of the accelerator or a first implementation of the accelerator.

Statement 52. An embodiment of the disclosure includes the system according to statement 51, wherein the frequency control signal is further based at least in part on one of a second workload of a second accelerator or a second implementation of the second accelerator.

Statement 53. An embodiment of the disclosure includes the system according to statement 52, wherein:

the first workload of the accelerator includes a first memory-bound workload or a first computational-bound workload; and the second workload of the second accelerator includes a second memory-bound workload or a second computational-bound workload.

Statement 54. An embodiment of the disclosure includes the system according to statement 52, wherein:

the first workload of the accelerator includes a first dimensionality of a first data to be processed using the accelerator or a first number of vectors of the first data to be processed using the accelerator; and the second workload of the second accelerator includes a second dimensionality of a second data to be processed using the second accelerator or a second number of vectors of the second data to be processed using the second accelerator.

Statement 55. An embodiment of the disclosure includes the system according to statement 52, wherein the frequency control signal is calculated to coordinate the accelerator and the second accelerator.

Statement 56. An embodiment of the disclosure includes the system according to statement 52, wherein the frequency control signal coordinates the accelerator and the second accelerator.

Statement 57. An embodiment of the disclosure includes the system according to statement 41, wherein applying the frequency control signal to the circuit of the accelerator by the control circuit includes applying the frequency control signal to the circuit of the accelerator by the control circuit for the data processing command.

Statement 58. An embodiment of the disclosure includes the system according to statement 41, wherein applying the frequency control signal to the circuit of the accelerator by the control circuit includes overriding a second frequency control signal by the control circuit based at least in part on the frequency control signal.

Statement 59. An embodiment of the disclosure includes the system according to statement 41, wherein applying the frequency control signal to the circuit of the accelerator by the control circuit includes de-asserting a second frequency control signal based at least in part on the frequency control signal.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device comprising an accelerator, the accelerator including:

an interface to receive a frequency control signal from a processor;

a Proportional Integrator Derivative (PID) controller to generate an internal frequency control signal for the accelerator;

a circuit to process data based at least in part on a data processing command from the processor; and a control circuit to set a frequency of the circuit based at least in part on the frequency control signal from the processor and to override the internal frequency control signal from the PID controller.

2. The device according to claim 1, wherein the interface is configured to receive the frequency control signal from a software executing on the processor.

3. The device according to claim 1, wherein the PID controller is configured to send the internal frequency control signal to the control circuit.

4. The device according to claim 1, wherein the control circuit applies the frequency control signal.

5. The device according to claim 1, wherein the frequency control signal is based at least in part on one of a first workload of the accelerator or a first implementation of the accelerator.

6. The device according to claim 5, wherein the frequency control signal is further based at least in part on one of a second workload of a second accelerator or a second implementation of the second accelerator.

7. The device according to claim 5, wherein:

the frequency control signal is further based at least in part on one of a second workload of a second accelerator or a second implementation of the second accelerator;

the first workload of the accelerator includes a first dimensionality of a first data to be processed using the accelerator or a first number of vectors of the first data to be processed using the accelerator; and the second workload of the second accelerator includes a second dimensionality of a second data to be processed using the second accelerator or a second number of vectors of the second data to be processed using the second accelerator.

8. The device according to claim 5, wherein the frequency control signal is further based at least in part on one of a second workload of a second accelerator or a second implementation of the second accelerator, the frequency control signal coordinating the accelerator and the second accelerator.

9. The device according to claim 1, wherein the control circuit applies the frequency control signal to the data processing command.

10. The device according to claim 1, wherein the frequency control signal de-asserts a second frequency control signal.

11. A method, comprising:

receiving an internal frequency control signal from a Proportional Integrator Derivative (PID) controller of an accelerator;

receiving a frequency control signal from a processor at a control circuit of the accelerator, the processor external to the accelerator; and applying the frequency control signal to a circuit of the accelerator by the control circuit, the circuit configured to process data based at least in part on a data processing command from the processor, including overriding the internal frequency control signal with the frequency control signal.

12. The method according to claim 11, further comprising sending the internal frequency control signal from the PID controller to the control circuit.

13. The method according to claim 11, wherein applying the frequency control signal to the circuit of the accelerator by the control circuit includes applying the frequency control signal to the circuit of the accelerator by the control circuit for the data processing command.

14. The method according to claim 11, wherein applying the frequency control signal to the circuit of the accelerator by the control circuit includes overriding a second frequency control signal by the control circuit based at least in part on the frequency control signal.

15. The method according to claim 11, wherein applying the frequency control signal to the circuit of the accelerator by the control circuit includes de-asserting a second frequency control signal based at least in part on the frequency control signal.

16. A system, comprising a non-transitory storage medium, the non-transitory storage medium having stored thereon instructions that, when executed by a machine, result in:

receiving an internal frequency control signal from a Proportional Integrator Derivative (PID) controller of an accelerator;

receiving a frequency control signal from a processor at a control circuit of the accelerator, the processor external to the accelerator; and applying the frequency control signal to a circuit of the accelerator by the control circuit, the circuit configured to process data based at least in part on a data processing command from the processor, including overriding the internal frequency control signal with the frequency control signal.

17. The system according to claim 16, wherein the frequency control signal is based at least in part on one of a first workload of the accelerator or a first implementation of the accelerator.

18. The system according to claim 17, wherein the frequency control signal is further based at least in part on one of a second workload of a second accelerator or a second implementation of the second accelerator.

19. The system according to claim 16, wherein applying the frequency control signal to the circuit of the accelerator by the control circuit includes applying the frequency control signal to the circuit of the accelerator by the control circuit for the data processing command.

20. The system according to claim 16, wherein applying the frequency control signal to the circuit of the accelerator by the control circuit includes overriding a second frequency control signal by the control circuit based at least in part on the frequency control signal.

* * * * *